United States Patent [19]

Nobusawa

[11] 3,971,046

[45] July 20, 1976

[54] SYSTEMS FOR RESPONDING TO NON-UNIFORM SCENE BRIGHTNESS

[75] Inventor: Tsukumo Nobusawa, Tokyo, Japan

[73] Assignee: Asahi Kogaku Kogyo Kabushiki Kaisha, Tokyo, Japan

[22] Filed: June 27, 1974

[21] Appl. No.: 483,711

Related U.S. Application Data

[63] Continuation-in-part of Ser. No. 456,380, March 29, 1974.

[30] Foreign Application Priority Data

July 2, 1973    Japan................................ 48-73650

[52] U.S. Cl.................................... 354/24; 354/31; 354/51; 354/60 E
[51] Int. Cl.².......................................... G03B 7/08
[58] Field of Search............... 354/31, 51, 60 EI, 24, 354/50, 60 R

[56] References Cited

UNITED STATES PATENTS

| | | | |
|---|---|---|---|
| 3,547,018 | 12/1970 | Haberle | 354/51 |
| 3,717,077 | 2/1973 | Harvey | 354/31 |
| 3,741,088 | 6/1973 | Nobusawa | 354/31 |

Primary Examiner—L. T. Hix
Assistant Examiner—Russell E. Adams, Jr.
Attorney, Agent, or Firm—Steinberg & Blake

[57] ABSTRACT

A system for responding to non-uniform scene brightness. The system includes a plurality of photosensitive devices which are capable of receiving light from different parts of a scene while remaining static with respect thereto. Through an electrical connecting structure these photosensitive devices are all electrically connected with an output structure which will provide an output determined by at least one of a pair of the photosensitive devices which are respectively exposed to light of maximum and minimum brightness from the scene. The plurality of photosensitive devices provide inputs which vary according to a geometric progression in accordance with the variation in light brightness. The electrical connecting structure, however, changes the geometric progression in the variation of the inputs from the plurality of photosensitive devices to an arithmetic progression so that at the output device there is achieved an output which varies according to an arithmetic progression, in this way enabling the output to be used directly for photographic purposes.

12 Claims, 8 Drawing Figures

SYSTEMS FOR RESPONDING TO NON-UNIFORM SCENE BRIGHTNESS

CROSS REFERENCE TO RELATED APPLICATION

This application is a continuation in part of copending application Ser. No. 456,380 filed Mar. 29, 1974 and entitled "Light-Measuring Systems".

BACKGROUND OF THE INVENTION

The present invention relates to light-responsive systems adapted to be used in connection with photography.

As is well known, such systems may be used, for example, for detecting the brightness of the light at a given scene which is to be photographed. Thus, "scene" to which reference is made in the present application and in the claims is any object which is to be photographed.

With conventional light-responsive systems it is necessary to move the system so that it will scan the light over the entire scene in order to detect the parts of the scene which have maximum and minimum brightness, assuming that the scene has a non-uniform brightness. This necessity of scanning by moving the light-responsive system is of extremely great inconvenience.

It has therefore already been proposed, as shown in the above parent application, to provide a plurality of photosensitive devices which are arranged for receiving light from different parts of a scene, so that while the plurality of photosensitive devices remain static with respect to the scene, nevertheless it will be possible to pick up by way of the plurality of photosensitive devices indications of maximum as well as minimum brightness.

However, since the intensity of the light varies according to a geometric progression, it is not possible to use the detected maximum and/or minimum brightness without additional procedures which will render these detections suitable for use. These additional procedures for converting the detected maximum and/or minimum brightness into a condition where use can be made thereof represent delays and inconveniences. Thus, in addition to the inconvenience, the delay may occasion the loss of an opportunity to make a photograph very rapidly of an object which will have a condition which it is desired to photograph only fleetingly.

SUMMARY OF THE INVENTION

It is accordingly a primary object of the present invention to provide a system of the above general type, capable of remaining static with respect to a scene while detecting maximum and/or minimum brightness thereof, while at the same time being capable of providing an output which may be directly used for photographic purposes to avoid the inconvenience and delay which is involved in outputs which vary only according to a geometric progression.

A more specific object of the present invention is to provide a system of the above type which can provide directly an output in the form a light value which may be directly used for photographic purposes.

A further object of the present invention is to provide a directly useful indication of the range between maximum and the minimum brightness.

Also, it is an object of the present invention to provide a directly useful output in accordance with an intermediate value of the range between maximum and minimum brightness.

Furthermore, it is an object of the present invention to provide a system of the above general type which is capable of being used in a fully automatic manner for bringing about an automatic determination either of exposure time or of the exposure aperture of a camera.

Furthermore, it is an object of the present invention to provide electrical structure for achieving the above objects, with this electrical structure being relatively simple and inexpensive as well as being capable of remaining to a large degree insensitive to fluctuations in temperature and voltage supply.

According to the invention the system which responds to a scene of non-uniform brightness includes a plurality of photosensitive means for respectively receiving light from different parts of the scene while remaining static with respect thereto so that the plurality of photosensitive means will respectively provide inputs in accordance with the different brightness at the various parts from which light is received, with these inputs varying according to a geometric progression. An output means is provided for providing an output from the inputs of the photosensitive means. The plurality of photosensitive means will of course include a pair of photosensitive means which will respectively provide inputs in accordance with the maximum and minimum brightness of the light received by the plurality of photosensitive means. An electrical connecting means interconnects the plurality of photosensitive means with the output means for providing at the latter an output determined by at least one of the pair of photosensitive means and for converting the input from this one photosensitive means from a geometrically varying progression to an arithmetically varying progression so that the output provided by the output means will vary according to an arithmetic progression. Thus, the necessity of carrying out calculations or the like necessary to convert an output which varies geometrically to an output which varies arithmetically are avoided with the present invention.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
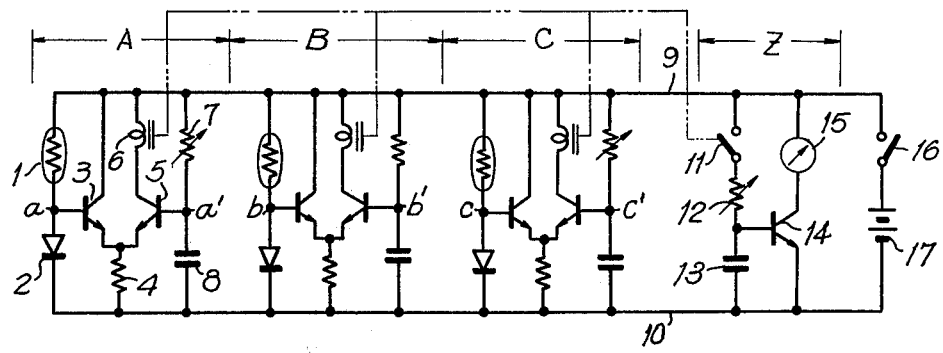
FIG. 1 is a wiring diagram of a system according to the present invention for providing an output in accordance with the minimum brightness of a scene.

Referring first to FIG. 1, there is illustrated therein a wiring diagram of an embodiment of the invention capable of automatically providing an output in accordance with the minimum brightness of a given scene. The structure illustrated in FIG. 1 includes partial brightness detector sections A, B, C, three of which are shown only by way of example since any desired number of these sections may be provided. The circuit also includes an indicator section Z where a value in accordance with a predetermined output is indicated, as will be apparent from the description below.

The several brightness detector sections A, B, C, etc., are of an identical construction, so that only the details of section A are described, it being understood that the remaining brightness detector sections are identically constructed. Thus it will be seen that section A includes a photosensitive means 1 which in the illustrated example is in the form of a photosensitive CdS resistor serving as a photo-detector element. As is well known when light is received by the photosensitive means 1 it will provide a given output determined by the brightness of the light. It is to be understood that while the several sections A–C are identical, the photosensitive means of the plurality of sections are oriented so as to be directed respectively to different parts of the scene, so that in this way the several photosensitive means of the several detector sections will receive light of differing brightness, assuming that the scene has a non-uniform illumination. Moreover, it is to be understood that the circuit of FIG. 1 may form part of a light meter structure so that the several photosensitive means 1 are directed toward the scene of non-uniform brightness for responding thereto, or the circuit may form part of a camera in which case the light received by the several photosensitive means 1 will first travel through the objective of the camera, in the case of a single lens reflex camera, to be reflected up into the viewfinder with the several photosensitive means 1 in this event receiving light at different parts of the viewfinder for responding to the different degrees of brightness of various parts of the scene toward which such a camera is directed.

The photosensitive means 1, as described above, is connected in series with a diode 2, this diode serving as a non-linear resistor element which operates to provide a log-conversion of the electrical quantity which corresponds to the light information, The series-connected components 1 and 2 are connected between a positive conductor 9 and a negative conductor 10. A junction point $a$ between the seriesconnected components 1 and 2 is electrically connected with the base of a transistor 3. This transistor 3 has its emitter connected through a resistor 4 to the negative conductor 10, while the collector of transistor 3 is electrically connected directly to the positive conductor 9.

The emitter of transistor 3 is also connected electrically with the emitter of a transistor 5, the collector of which is connected through an electromagnetic solenoid 6 with the positive conductor 9. This coil 6 forms part of a relay which includes the switch 11 which is controlled by the solenoid 6. The switch 11 forms part of the indicator section Z. In the illustrated example the switch 11 is a normally closed switch. Upon energizing of the coil 6 the switch 11 is opened.

The base of transistor 5 is electrically connected with a junction point $a'$ between a variable resistor 7 provided for timing purposes and a timing capacitor 8. The series-connected timing resistor 7 and timing capacitor 8 are connected between the positive conductor 9 and the negative conductor 10 in the manner illustrated. Thus it will be seen that the transistors 3 and 5 form a differential amplifier enabling a comparison to be made in a manner described below.

As was pointed out above, no detailed description is provided of the section B and C which are constructed in the same way as the section A described above. The capacitor 8 of the section A and the corresponding capacitor of the other sections B, C, etc., are changed during operation and the rate of rise of the terminal voltage of the several capacitors is identical. FIG. 1 schematically indicates the manner in which the several relay coils 6 control the common relay switch 11. Control of a single switch or armature element from a number of coils is well known.

The indicator section Z includes the normally closed relay switch 11 which opens when the electromagnetic solenoid 6 is energized. As will be seen from the description which follows, the switch 11 forms a relay also with the corresponding solenoids of the other detector sections B, C, etc., so that upon energizing of any one of the detector sections the switch 11 will open. The switch 11 is connected in series with a variable timing resistor 12 which is connected in series with a timing capacitor 13 which also serves as a memory or storing capacitor, these series-connected components 11–13 being electrically connected between the positive conductor 9 and the negative conductor 10. A junction between the variable resistor 12 and the capacitor 13 is electrically connected to the base of a transistor 14 of high input impedance. The emitter of transistor 14 is connected electrically to the negative conductor 10 while the collector thereof is connected through a meter 15 to the positive conductor 9. Finally, the illustrated circuit includes a main or source switch 16 connected in series with a power source formed by the battery 17, and the series-connected switch 16 and battery 17 are also connected between the positive conductor 9 and the negative conductor 10.

As was indicated above, the several photosensitive means of the several detector sections A–C will receive light from different parts of the object or scene to be photographed. Upon closure of the switch 16, the capacitor 8 of each detector section begins to be charged and there appears at a junction $a$ in detector section A (and at the corresponding junctions of the other sections) a voltage Va which has been converted from the quantity corresponding to the light information under the non-linear characteristic of the diode 2, in accordance with the particular brightness of light to which the particular photosensitive means 1 has been exposed. This voltage Va will vary in accordance with the present invention, according to an arithmetic progression while the brightness varies according to a geometric progression.

For a given time after closure of the switch 16, the transistor 3 remains ON, while the transistor 5 remains OFF, or in other words the transistor 3 is in a conductive state while the transistor 5 remains in a non-conductive state, as a result of the bias voltage produced by way of the resistor 4. Therefore, during this period the electromagnetic solenoid 6 remains unenergized. Of course, these operations for the section A also apply to the sections B, C, etc.

Assuming now that the photosensitive means 1 of section A happens to be that one of the plurality of photosensitive means which is exposed to light of minimum brightness, then the voltage Va at the junction point $a$ of section A will assume a value lower than any of the corresponding voltages at the other sections B, C, etc., and thus the terminal voltage $Va'$ of the capacitor 8 of section A, under the above conditions, will be the first of the several capacitors of the several detecting sections to reach a voltage corresponding to the voltage Va at the junction point $a$ of the detecting section A. Thus, while the capacitors of the sections B, C, etc., which correspond to the capacitor 8 of section A still continue to be charged, the capacitor 8 of section A has already reached a charge providing at the junction point $a$ a voltage which equals the voltage at the junction point $a$ of section A. Therefore, the transistor 5 of the section A is the first of the corresponding transistors of all of the detecting sections to transfer to the ON state, thus energizing the solenoid 6 of section A while the remaining solenoids of the other sections remain unenergized, and thus with this embodiment the switch 11 of indicator section Z will open in response to detection of light of minimum brightness by one of the photosensitive means 1, this being the photosensitive means 1 of section A in the above example. Upon opening of the switch 11 under these conditions the charging of the capacitor 13 is interrupted. During charging of the capacitor 13 the meter 15 responds with its pointer moving to indicate the brightness value, and at the instant when the switch 11 opens the termination of the charging of the capacitor 13 terminates the movement of the pointer 15 so that the latter now indicates a value corresponding to the minimum brightness of the scene or object which is to be photographed. The value indicated by the meter 15 thus is an indication of the minimum brightness of the scene and this value is indicated in the form of a log-converted light information value which varies according to an arithmetic progression coverted from the corresponding geometric progression of the brightness variation itself. This indicated value is a light value, the so-called V value indication which is directly used in a photographic operation in an extremely convenient manner eliminating any further processing of a value which would vary according to a geometric progression.

Thus, with the embodiment of FIG. 1, there are a plurality of photosensitive means connected to the output means 15 by way of the illustrated electrical connecting means, with the particular photosensitive means which responds to light of minimum brightness in this embodiment acting through the electrical connecting means to cause the output means to provide an output according to an arithmetic progression which is a given light value indicative of minimum brightness.

The arrangement which is illustrated in FIG. 1 may be altered by vertically interchanging the several photosensitive means and the diodes respectively connected in series therewith so that the series-circuit composed of components 1, 2, in each detecting section can be inverted with respect to the arrangement thereof shown in FIG. 1. With such an alteration of the circuit of FIG. 1, the resulting circuitry will give at the output means 15 an indication of maximum brightness. Assuming, for example, that the photosensitive means 1 of the detecting section A is the particular photosensitive means which is exposed to light of maximum brightness, then the voltage appearing at point $a$ will have a value lower than any of the corresponding voltages at the corresponding points in the other sections. As a result the solenoid 6 of section A will again be that solenoid which is first energized to terminate the operation of the meter 15, as in the above example, so that through this simple modification of the circuitry of FIG. 1 it is possible to provide an indication of maximum brightness.

It is to be noted that although the timing capacitors of the several detecting sections A–C and the indicator section Z must be linearly charged in order to obtain a brightness value indication in the form of an arithmetic progression, the voltage which is present at the junction point $a$ is relatively low due to the characteristic of the diode, so that an initial portion of the timing curve which is in fact substantially linear may be effectively used as the comparison voltage. In addition, a relatively high source voltage may be used or a slope voltage generator such as a bootstrap circuit of a well known type may be utilized to prolong the linear portion of the timing curve.

Figure 2:
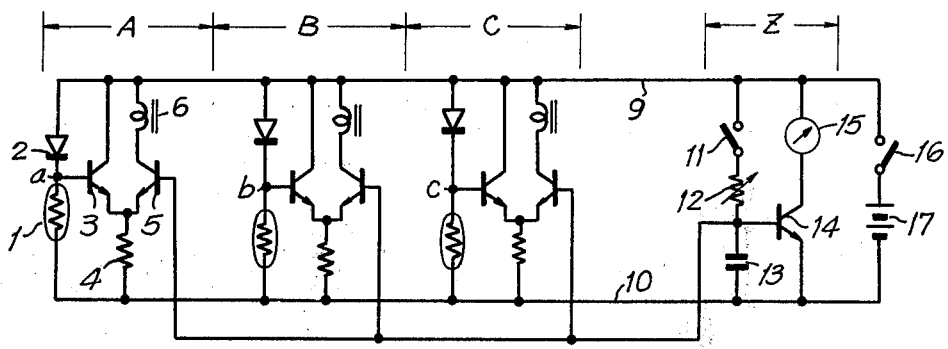
FIG. 2 shows another embodiment of a circuit according to the invention, this embodiment providing an output according to the maximum brightness of a scene.

In the above embodiment of FIG. 1 the partial brightness detector sections A, B, C, etc., are separately provided with their respective timer circuits for comparison, As a result the circuitry is relatively complex. This circuitry can be simplified according to another embodiment of the invention which is illustrated according to another embodiment of the invention which is illustrated in FIG. 2, with this particular embodiment being provided for determination of maximum brightness. In this embodiment the timing circuits required for coparison are combined into a single timing circuit which serves also as the timing circuit for indicating the output value.

Referring to FIG. 2, those parts which are in common with the embodiment of FIG. 1 are designated by the same reference characters and are not further described. It will be seen that in FIG. 2 the diode 2 of each of the detecting sections is connected in series with the photosensitive means 1 between the positive conductor 9 and the negative conductor 10, with the series-connected diode and photosensitive means of each section being inverted with respect to the position thereof as shown in FIG. 1. The base of the transistor 3 is connected to the junction point $a$ between the series-connected components 1 and 2. The bases of the transistor 5 and the corresponding transistors of the other detecting sections B, C, etc., are all connected to a common junction point between the variable resistor 12 and capacitor 13 in the section Z, as illustrated.

With the embodiment of FIG. 2, upon closing of the source switch 16, divided voltages will be produced at the points $a$, $b$, and $c$, these being the junction points between the several photosensitive means 1 and the corresponding diodes 2 of the several detecting sections A, B, C. The divided voltage appearing at each of these junction points has a value which is inversely proportional to the amount of light to which the particular photosensitive means is exposed, or in other words to the brightness at the object or scene which is to be photographed, and this divided voltage takes the form of a voltage which varies according to an arithmetic progression in accordance with the brightness information which varies according to a geometric progression. Assuming that it is the detecting section A which has the photosensitive means 1 which is exposed to light of maximum brightness, then the voltage appearing at the junction point $a$ will have a value lower than the voltages at the corresponding junction points of the other sections B, C, etc. Thus, the capacitor 13 of the timing circuit in the section Z begins to be charged upon closure of the switch 16 so that the terminal voltage of capacitor 13 rises during elapse of time. This rising voltage is uniformly applied to the several transistors 5 of the differential amplifiers of the several detecting sections A, B, C, etc., and as a result it is the transistor 5 in section A, where the voltage at the point $a$ has the lowest value, which first transfers from the OFF to the ON state, while the remaining transistors 5 of the other detecting sections still remain in the non-conductive state. Thus, under these conditions it is the solenoid 6 of section A which first becomes energized, with the result that at this instant the switch 11 opens and the meter 15 will indicate a value according to the maximum brightness as log-converted from the photo-information.

In this case also it is possible to convert the embodiment of FIG. 2 into a embodiment which will indicate minimum brightness, simply by inverting the series-connected components 1, 2, of each of the detecting sections, and of course the operation of such a modified circuit will correspond to that set forth above in connection with FIG. 1.

Figure 3:
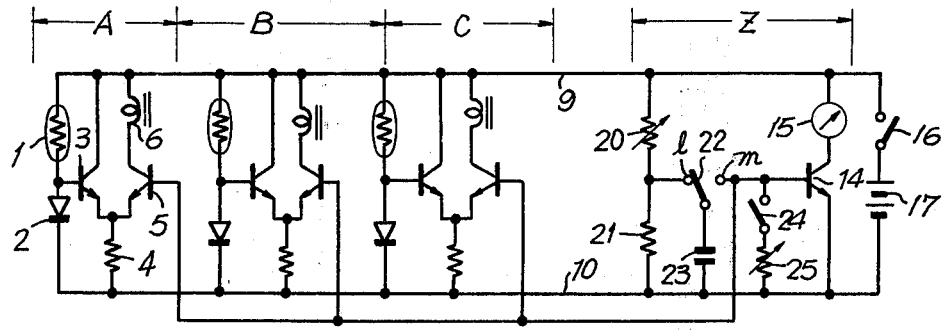
FIG. 3 is a further embodiment of a circuit according to the present invention, this embodiment providing also an output according to minimum brightness but differing from the embodiments of FIGS. 1 and 2 in that this embodiment operates according to the discharge of a capacitor whereas the embodiments of FIGS. 1 and 2 operate in accordance with charging of a plurality of capacitors in the case of FIG. 1 and a single capacitor in the case of FIG. 2.

Although in the above-described embodiments use is made of a voltage which varies during charging of the associated timing circuit to bring about the electrical scanning and comparative detection of brightness, it is also possible in accordance with the invention to utilize a voltage which varies as the associated timing circuit is discharged during the static scanning as referred to above. Thus, FIG. 3 illustrates an embodiment of the invention capable of indicating the minimum brightness while utilizing a single timing circuit which discharges while acting to achieve a comparison which will indicate the desired value. In FIG. 3 those parts which are common to those in the embodiments of FIGS. 1 and 2 are designated by the same reference characters and are not further described in detail.

FIG. 3 has an indicator section Z which is arranged in such a way that a variable resistor 20 is connected in series with resistor 21. These series-connected resistors 20, 21 are connected between the positive conductor 9 and the negative conductor 10. A junction point between the series-connected resistors 20 and 21 is electrically connected with a switch contact $l$ forming part of a change-over switch 22 which includes a movable switch member electrically connected through a capacitor 23 to the negative conductor 10. Capacitor 23 serves not only as a timing capacitor but also as a memory or storing capacitor. The switch 22 includes also a contact $m$, and normally the switch 22 is in the illustrated position where the switch is closed at the contact $l$ but open at the contact $m$.

The normally open contact $m$ of the change-over switch 22 is electrically connected with the base of a transistor 14 of high input impedance. A normally open switch 24 is connected in series with a variable timing resistor 25, and the series-connected components 24, 25 are connected between the base of transistor 14 and the negative conductor 10. This normally open switch 24 forms the relay switch of the embodiment of FIG. 3. Thus, the normally open switch 24 will be closed upon energizing of any one of the electromagnetic solenoids of the detector sections A, B, C, etc., which corresponds to the solenoid 6 shown in the section A. The bases of the several transistors 5 of the several differential amplifiers are all connected in common to the normally open contact $m$ of the change-over switch 22.

With the embodiment of FIG. 3, upon closure of the source switch 16, a divided voltage will be produced at the junction point between the resistors 20 and 21 in the section Z, and as a result the capacitor 23 is charged up to a predetermined voltage. When the switch 22 is changed over from contact $l$ to contact $m$, with the capacitor 23 thus charged, the voltage stored therein is applied to the bases of the several transistors 5 of several differential amplifiers.

The meter 15 will operate so that its pointer points to a graduation corresponding to the maximum brightness in accordance with the voltage stored at capacitor 23 when the switch 22 is changed over to the normally open contact $m$. This stored voltage is previously selected to have a value sufficiently greater than the voltage produced from each diode 2, in order that the follower transistor 5 of the several differential amplifier circuits are all turned ON at the same time, and thus all of the solenoids 6 are simultaneously energized when the switch 22 is closed at its contact $m$. Therefore, simultaneously with the energizing of the several solenoids 6, the normally open switch 24 is closed with the result that the capacitor 23 starts to discharge and the meter 15 operates to return its pointer gradually to the starting or minimum graduation as the stored voltage drops. That one of the detecting sections A–C which has the highest voltage at the junction between the diode 2 and the photosensitive means 1 will provide between the transistor 3 and transistor 5 of the differential amplifier thereof operation according to which the solenoid 6 of this particular detecting section will be the first to be deenergized inasmuch as the transistor 5 of this particular section will be the first to transfer from the ON to the OFF state. However, the remaining solenoids 6 of the remaining detecting sections still remain energized, so that the switch 24 remains closed and the capacitor 23 continues to discharge.

This operation will continue with the several solenoids 6 of the several detecting sections becoming deenergized one after the other while the switch 24 remains closed until the last of the solenoids 6 becomes deenergized. Upon deenergizing of the last solenoid 6 of the several detecting sections, the switch 24 will resume its open position so that at this instant the meter 15 will stop operating, thus giving an indication of the light intensity at this instant. This value of light intensity is an indication of the minimum brightness inasmuch as the termination of the operation of the meter 15 is brought about by that one of the photosensitive means which responds to the light of minimum brightness.

Figure 4:
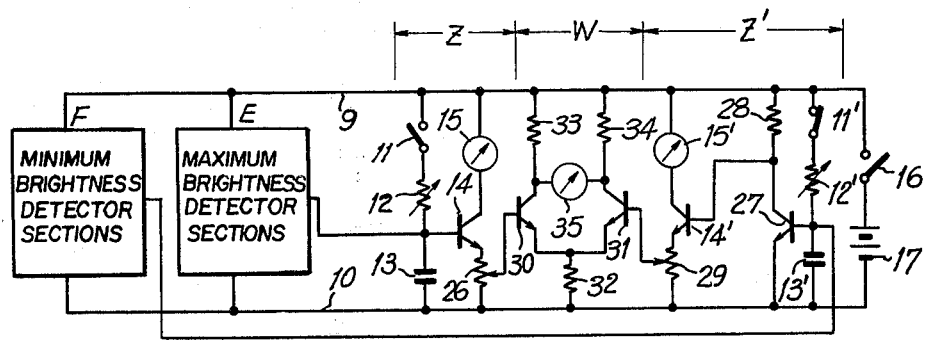
FIG. 4 illustrates a further embodiment of a circuit according to the present invention for giving outputs not only according to maximum and minimum brightness but also according to the range of brightness therebetween.

In the embodiments described above and shown in FIGS. 1–3, the output means 15 provides an output according to an arithmetic progression in the form of a light value which is determined by one of the pair of photosensitive means which are respectively exposed to light of maximum and minimum brightness, with the electrical connecting means described above in connecting the plurality of photosensitive means with the output means to provide at the latter the maximum or minimum light value indication which varies according to the arithmetic progression although the brightness itself varies according to a geometric progression. The embodiment of FIG. 4 is capable of indicating a range of brightness between the maximum and the minimum brightness log-converted from the inputs provided by the several photosensitive means as described above. Referring to FIG. 4, the block E represents a plurality of partial brightness detector sections as described above for providing an indication of maximum brightness, as described above as described above in connection with FIG. 2, while the block F represents a plurality of brightness-detecting sections A, B, C, etc., which indicate the minimum brightness corresponding also to the circuit of FIG. 2, but wherein the series-connected photosensitive means 1 and diode 2 of each detecting section A, B, C, etc., are inverted. The indicating section Z of FIG. 4 is the section for indicating maximum brightness while the indicating section Z' of FIG. 4 is the indicator section which indicates minimum brightness. The section W in FIG. 4 is an indicator section which provide an indication of the range of brightness. Thus, the block E includes a series of sections A, B, C, etc., as illustrated in FIG. 2, with the conductor shown in FIG. 4 extending from the block E to the junction between the capacitor 13 and the variable resistor 12 corresponding to the conductor shown at the lower part of FIG. 2 also extending to the junction between the capacitor 13 and variable resistor 12 in FIG. 2. The block F shows the same structure except that in each detecting section the components 1 and 2 are inverted, as compared with their relationship shown in FIG. 2, and the conductor shown in FIG. 4 extending from the block F to the junction between the capacitor 13' and the variable resistor 12' corresponds also to the conductor shown in FIG. 2 extending to the junction between the capacitor 13 and the variable resistor 12.

The section Z of FIG. 4 corresponds to the indicator section Z of FIG. 2 wherein a variable resistor 26 has been inserted between the emitter of transistor 14 and the negative conductor 10. The section Z' of FIG. 4 corresponds to the indicating section of FIG. 1 to which a phase inverter section has been added. More specifically, the section Z' is arranged in such a way that the base of a transistor 27 is connected to the junction point between the variable resistor 12' and the capacitor 13'. The emitter of transistor 27 is connected to the negative conductor 10 while the collector thereof is connected to a resistor 28 as well as to the base of a transistor 14'. The resistor 28 has its other terminal connected to the positive conductor 9. The emitter of transistor 14' is connected through the variable resistor 29 to the negative conductor 10.

The range-indicating section W has the sliding contact of variable resistor 26 connected to a transistor 30 the emitter of which is interconnected with the emitter of a transistor 31, and the emitters of both transistors 30 and 31 are connected through a resistor 32 to the negative conductor 10. The collectors of transistors 30 and 31 are separately connected, respectively, through resistors 33 and 34 to the positive conductor 9. An ammeter 35 is electrically connected between these collectors, and it is apparent that the transistors 30 and 31 form a differential amplifier.

As was the case with the embodiments described above, the relay switch 11 of indicator section Z is normally closed and adapted to be opened in accordance with the energizing of the electromagnetic solenoids included in the detector sections which constitute the maximum brightness detector block E, upon closing of the switch 16. At this instant when the switch 11 of indicator section Z opens, a voltage is stored in the capacitor 13 of section Z according to the maximum brightness value, and this maximum brightness value is indicated at the meter 15 which forms the output means of the section Z. A voltage according to this latter stored voltage appears across the variable resistor 26 as the emitter-follower voltage which is applied through the sliding contact of variable resistor 26 to the base of transistor 30. It will be understood from the above-described embodiment that this particular voltage takes a value which is inversely proportional to the brightness due to the characteristic of the highest brightness detector block E.

The switch 11' of indicator section Z', which is normally closed, opens, on the other hand, in accordance with a signal from the electromagnetic solenoids included in the minimum brightness detector block F, and a voltage according to the minimum brightness value is stored at this moment in the capacitor 13'. Thus, the meter 15' forms an output means indicating the minimum brightness value. However, this stored voltage is not directly applied to the differential amplifier in section W, as was the case with section Z, since this particular voltage has a value proportional to the brightness due to the characteristic of the minimum brightness detector block F, as pointed out above in connection with FIG. 1. Therefore, there would be no significance in determining the difference between this latter voltage and a voltage which is inversely proportional to the brightness. According to the embodiment of FIG. 4, the phase inverter transistor 27 operates in such a way that the lower the voltage stored in capacitor 13', or in other words the lower the minimum detected brightness, the higher will be the voltage appearing across the variable resistor 29. As a result, in response to this latter voltage the meter 15'' will indicate the minimum brightness value.

The potential appearing across the collectors of transistors 30 and 31, to the bases of which both of the above voltages are separately applied, is, as is well known, proportional to a difference between both inputs. Consequently, the meter 35 will indicate a difference between these two voltages, and thus the meter 35 will indicate a value corresponding to the range of brightness.

Thus, the embodiment of FIG. 4 is characterized by the fact that a value corresponding to the range of brightness will be indicated, with this particular range being the same irrespective of whether the particular scene or object which is photographed has a brightness which varies while remaining relatively intensely illuminated or a brightness which varies while remaining relatively dark. In other words the range will not indicate whether the scene is relatively bright or relatively dark. Thus it is possible for two different ranges of brightness, namely a relatively bright range or a relatively dark range to be indicated by the same value since both input signals are applied to the differential amplifier in log-converted form. For example, meter 35 may indicate a range of 4 LV with respect both to the brightness range defined by a relatively high brightness of 5 LV and a minimum brightness of 1 LV, while the same range will be defined in the case where there is a maximum brightness of 8 LV and a minimum brightness of 4 LV since the difference between the maximum and minimum brightness in both cases is 4 LV.

However, the embodiment of FIG. 4 is of considerable advantage in that the brightness range indication is achieved directly without any inconvenient or troublesome calculation operations.

Although in the above embodiment a phase inverter circuit is shown as incorporated into the section Z', this circuit may instead be incorporated into section Z.

Moreover, the meters may be replaced by corresponding indicators such as lamps which will be illuminated or extinguished at predetermined values serving also as a convenient means for warning the operator as to the upper and lower limits at which a proper exposure can be made.

Although the sections Z and Z' respectively include timer circuits which operate by being charged, in the embodiment of FIG. 4, these sections may also have, instead, timer circuits which operate according to discharge, as well as the case with the section Z in the embodiment of FIG. 3.

Figure 5:
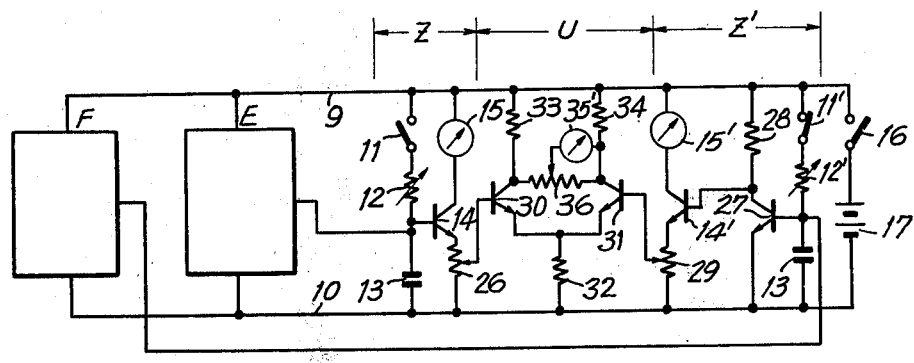
FIG. 5 illustrates a variation of the embodiment of FIG. 4 according to which with the embodiment of FIG. 5 it is impossible to determine an intermediate value of the range between the maximum and minimum brightness.

The embodiment of FIG. 5 differs from that of FIG. 4 in that an intermediate value of the brightness range will be indicated whereas in the embodiment of FIG. 4 the brightness range between the maximum and minimum brightness is indicated. Thus, referring to FIG. 5 it will be seen that the section U is capable of providing an output according to an intermediate value of the range of brightness, similar to the section W of FIG. 4, except that the meter 35 of FIG. 4 is replaced by a variable resistor 36 and a meter 35' connected between the sliding contact of variable resistor 36 and the collector of transistor 31. Accordingly, the description will apply only to the modification of FIG. 5 as compared with the embodiment of FIG. 4. The variable resistor 36 incorporated between the transistors 30 and 31 in FIG. 5 enables the voltage across the collectors of the transistors 30, 31 to be optionally divided so that the sliding contact of variable resistor 36 may be set to a predetermined position to obtain an intermediate value of the brightness range regulated in accordance with the particular photographing operation which is desired.

Furthermore, the voltages divided by the sliding contacts of variable resistors 26 and 29 may be applied to the respective inputs of each differential amplifier. The result is that the indication provided by meter 35' can be used as a value for selecting shutter time, or in other words exposure time, by presetting the variable resistor 26 to the ASA or sensitivity of the film which is to be exposed while the variable resistor 29 may be preset to a value corresponding to the selected diaphragm aperture. Alternately, the resistor 29 may be set according to the desired exposure time so that in this case the indication provided by the meter 35' may be used for setting the diaphragm at a given exposure aperture.

Selection of the exposure coefficient in the well known exposure system is brought about by moving the sliding contact of the variable resistor 36.

Thus, an intermediate value of the brightness range for achieving a proper exposure or an intermediate value appropriate to a particular photographing operation may be automatically and rapidly achieved according to the embodiment of FIG. 5. As a result the operations involved with the setting of a photographic camera or the like may be rapidly carried out with this embodiment during actual photographing operations.

However, the embodiment of FIG. 5 still provides only an indication of the setting which should be provided in a camera, and the actual operation of the setting of the exposure time or the setting of the diaphragm of the camera based upon the indication provided by the meter 35' of FIG. 5 must still be carried out. The embodiments of FIGS. 6 and 7 eliminate this additional operation which must be performed by the camera operator in that the embodiment of FIG. 6 may be used for automatically setting the exposure time while the embodiment of FIG. 7 may be used for automatically setting the diaphragm.

Figure 6:
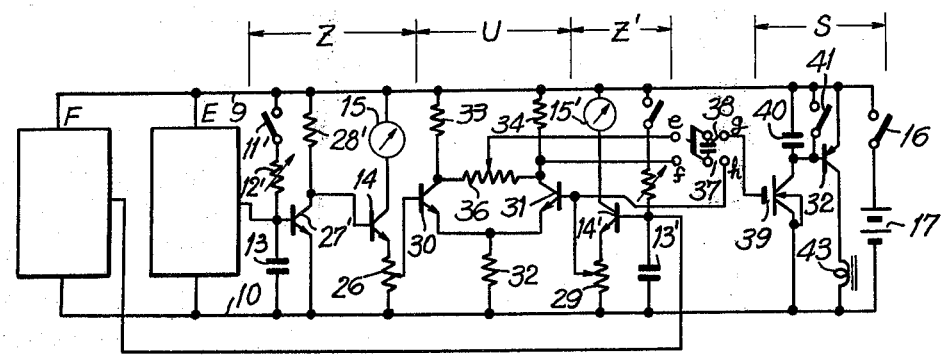
FIG. 6 illustrates the manner in which a system as shown in FIG. 5 may be used for directly determining exposure time in a camera.

Thus, the embodiment of FIG. 6 may be utilized for automatically controlling exposure time in a camera which is provided with an electrical exposure-time determining circuit of the inner photometric type, which is to say a camera which is provided with electrical circuitry for automatically determining when the shutter will close after a given exposure time has elapsed. In the embodiment of FIG. 6 those parts which are common to the previously described embodiments are designated by the same reference characters and symbols. The section Z of FIG. 6, corresponds to the section Z' of FIG. 4 in which a phase inverter transistor 27' and a resistor 28' are inserted, while the transistor 27 for phase inversion in section Z' of FIG. 4 is omitted together with the resistor 28 of FIG. 4. The section S of FIG. 6 designates an electrical shutter-controlling section wherein the contact e of the double-pole double-throw switch 37 is connected to the sliding contact of variable resistor 36 while the other contact f of the switch 37 is electrically connected with the collector of the transistor 31. A memory or storage capacitor 38 is electrically connected between the swingable, electrically conductive switchblade members of the switch 37. The contacts e, f of switch 37 are normally closed. The normally open switch contact h of the switch 37 is electrically connected with the base of the transistor 31, while the remaining normally open contact g of the switch 37 is electrically connected to the gate of a field effect transistor (FET) 39 which serves as a logarithmic expansion current control member whose source is connected with the negative conductor 10 and whose drain is connected to a timing capacitor 40. A normally closed switch 41 and the base of a transistor 42 are also connected to the drain of FET 39. The capacitor 40, the switch 41, and the emitter of transistor 42 are all electrically connected to the positive conductor 9, while the collector of transistor 42 is connected through the electromagnetic solenoid 43 to the negative conductor 10. When the solenoid 43 is energized the trailing curtain of the unillustrated camera shutter is released in order to close the shutter and terminate the exposure.

With the embodiment of FIG. 6, the voltage appearing across the sliding contact of variable resistor 36 and the collector of transistor 31 is identical with the voltage appearing at the corresponding parts of FIG. 5 and corresponds to the intermediate value of the brightness range having therein the information in accordance with the exposure factors. This voltage is stored by way of the normally closed contacts e f in the memory capacitor 38. During operation of the camera shutter, the memory capacitor 38 is connected by operation of the switch 37 to the normally open contacts g h, and the stored voltage is superimposed upon the signal indicative of minimum brightness which is applied to the base of transistor 31. In this way there is provided an intermediate value signal which is in turn applied to FET 39 to assure a proper exposure. This signal voltage varies according to an arithmetic progression and must be expanded to its original form of a geometric progression in order to control the shutter time properly, and for this purpose the non-linear characteristic of FET 39 is utilized. The leading shutter curtain is of course driven in advance of the trailing shutter curtain in order to open the shutter, in a mechanical manner, and at this instant, which is to say simultaneously with opening of the shutter, the normally closed switch 41 is opened in a well known manner so that the timing capacitor 40 starts to be charged with the current determined by the internal resistance of FET 39 at this instant. When a predetermined value of the stored voltage is reached, or in other words after elapse of a predetermined time, the electromagnetic solenoid 43 is energized through the transistor 42 and then the trailing curtain is released in order to close the shutter.

This particular embodiment of the invention is of considerable advantage during actual photography inasmuch as the control voltage for the electrically operable shutter has all of the information with respect to the various exposure factors required for achieving a proper photograph and the shutter will achieve the correct exposure time taking into consideration the curve of film density, in a fully automatic manner.

Figure 7:
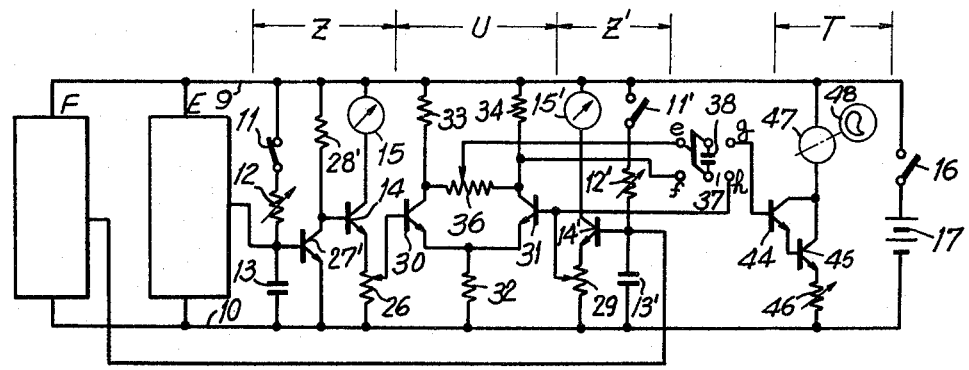
FIG. 7 illustrates the manner in which a system according to that of FIG. 5 may be used for directly controlling the diaphragm of a camera.

With the embodiment of FIG. 7 it is the diaphragm which is automatically set in accordance with the intermediate brightness signal. Those parts of FIG. 7 which are common to the previously described embodiments are designated by the same reference characters and symbols without repeating the description thereof. Referring to FIG. 7, the section T designates an automatic diaphragm-setting section arranged in such a way that the normally open contact g of the double-pole double-throw switch 37, which has the normally closed contact e f, is electrically connected to the base of a transistor 44 forming a Darlington circuit wherein the emitter of transistor 44 is connected to the base of transistor 45 with the collectors of transistors 44 and 45 being connected through an electrical drive 47 to the positive conductor 9, this electrical drive 47 being in the form of any moving coil instrument or the like, for example, the rotor of which is connected with the diaphragm 48 so as to adjust the latter. The emitter of the transistor 45 is connected through a variable resistor 46 to the negative conductor 10.

Thus, the embodiment of FIG. 7 will operate in the same way as the embodiment of FIG. 6 with the switch 37 being changed over in the manner described above in connection with FIG. 6, so that the intermediate brightness signal is applied to the base of the transistor 44, this signal corresponding to the diaphragm setting assuming that one of the variable resistors 26 or 29 has been preset to correspond to the selected exposure time while the other of these variable resistors has been preset to the value corresponding to the film speed. The drive 47 is operated by the current flowing through the transistors 44, 45 which receive this signal with the result that the diaphragm 48 is operated to provide an automatically determined proper exposure aperture.

Figure 8:
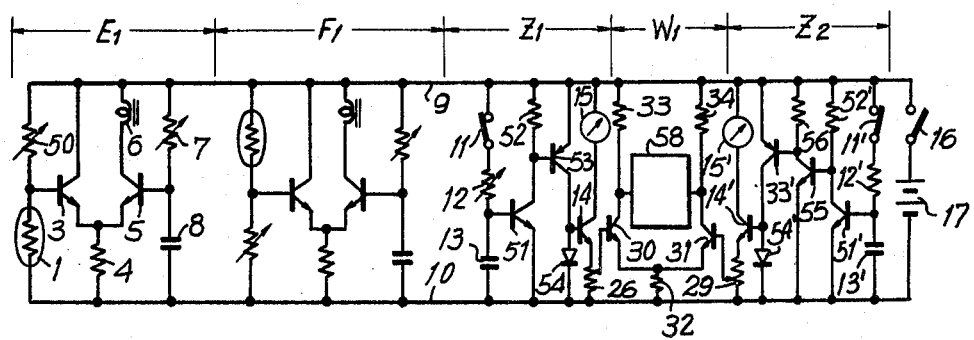
FIG. 8 illustrates an embodiment of the invention similar to that of FIG. 4 but differing from all of the other embodiments in that with the embodiment of FIG. 8 it is possible to use a minimum number of diodes.

FIG. 8 illustrates an embodiment of the invention where both maximum and minimum brightness are indicated in log-converted form together with an indication of brightness range between the maximum and minimum brightness, as was the case with FIG. 4. However, in distinction from the embodiments of FIGS. 1–3 where each brightness detector section includes a diode for log-conversion, with the embodiment of FIG. 8 a variable resistor is utilized instead of the diode with each brightness detector section having a variable resistor connected in series with the photosensitive means. Thus, it will be seen that each of the maximum brightness detector sections, represented by the section $E_1$ in FIG. 8 has a variable resistor 50 connected in series with the photosensitive means 1 thereof, while each minimum brightness detector section, represented by the section $F_1$ in FIG. 8, has a corresponding variable resistor connected in series with the photosensitive means thereof. In the embodiment of FIG. 8 a single diode 54 is provided in the maximum brightness indicating section $Z_1$ and a single diode 54' is incorporated into the minimum brightness indicating section $Z_2$.

The brightness detector sections $E_1$ and $F_1$ of FIG. 8 operate in the same way as the detector section A of FIG. 1 or the detector sections which have the photosensitive means and the associated diode inverted with respect to the arrangement of FIG. 1, detecting in this way the maximum or minimum brightness respectively, and opening the normally closed switches 11, 11' respectively included in the indicating sections $Z_1$, $Z_2$ so as to store signal voltages for maximum and minimum brightness respectively in the capacitors 13 and 13'. These voltages will of course vary according to a geometric progression, since this is the manner in which the brightness or photo-information varies. However, the diode 54 is energized through the transistor 51 coupled to the capacitor 13 and a transistor 53 which is coupled to the transistor 51, so that in this way the voltage which appears across the terminals of diode 54 is log-coverted due to the non-linear characteristic of the diode 54 from the form of a geometric progression into the form of an arithmetic progression. Thus, the transistor 14 is applied with this latter voltage which causes the meter 15 to indicate the maximum brightness.

The section $Z_2$ which includes the capacitor 13' is adapted to have stored therein a signal voltage indicative of the minimum brightness and operates in a manner similar to the indicator section $Z_1$ except that the signal obtained in the illustrated transistor 51' is phase inverted by the circuit which includes the transistor 55 and the resistor 56, in the same way that phase inversion is brought about in the section Z' of the embodiment of FIG. 4. Thus a voltage in the form of an arithmetic progression is produced across the terminals of the diode 54' and the transistor 14' has this latter voltage applied thereto so as to cause the meter 15' to indicate the minimum brightness.

The maximum and minimum brightness values achieved in this way with the embodiment of FIG. 8 are equivalent to those achieved with the embodiment of FIG. 4, so that these information signals may be applied to the section $W_1$ in the same way that the corresponding signals are applied to the section W of FIG. 4 or to the section U of FIG. 5 to achieve in this way a brightness value range or an intermediate value of the brightness range at an indicator 58.

The embodiment of FIG. 8 is advantageous in that the number of diodes required for log-conversion is limited to such an extent that it is possible effectively to avoid the thermal influence on the characteristic of the diodes which is accumulated due to the use of several diodes, reducing the accuracy of the determination of brightness.

It is apparent that in all of the embodiments of the invention described above the electrical connecting means which electrically connects the plurality of photosensitive means with the output means includes a timing circuit means having at least one resistor and capacitor connected in series. The capacitor of the timing circuit means has a charge which varies during the time interval when the plurality of photosensitive means respond to light from different parts of a scene. Thus, this charge increases at the capacitor 13 in the case of FIGS. 1 and 2, for example, whereas in the case of FIG. 3 the charge on the capacitor 23 decreases during this time interval, as described above. Moreover, the electrical connecting means includes a relay switch means for opening the timing circuit means for terminating the variation in the charge of the capacitor thereof when a given photosensitive means registers the maximum brightness or the minimum brightness, this relay switch means being formed by the relay coil 6 and switch 11, or by the relay coil 6 and the switch 24 in the case of FIG. 3. Thus, it is the charge remaining at the capacitor of the timing circuit means which is used at the output means, such as the meter 15, for providing in this way at the output means a value indicative of either maximum brightness, minimum brightness, a range of brightness, etc., as described above. In this way with the present invention the desired results are achieved in a dynamic manner, in that the varying charge of a capacitor is utilized to determine the output.

As is apparent from the above description, the determination of brightness according to the invention may be carried out statically with an indication being given, as desired, of maximum and/or minimum brightness, as well as, if desired, a value of the range of brightness or an intermediate value of the brightness range, and these signals which have been log-converted so as to vary according to an arithmetic progression are achieved simply by directing a group of photosensitive means toward the object which is to be photographed without using a means such as kinetic scanning with respect to the object to be photographed, as is usually required. When the device of the invention is incorporated into a camera, the operations in connection with exposure may be easily carried out without turning the camera, so that a proper exposure will be achieved in accordance with a particular density curve of the film without any requirement of great skill even with respect to an object for which it is relatively difficult to determine the proper exposure. In the case where determination of brightness is brought about by comparators, such as differential amplifiers, the device of the present invention is particularly advantageous in that the operation is stabilized by limiting the effect of influences such as fluctuations in voltage source and temperature to a minimum.

Moreover, the device according to the present invention is capable of determining an appropriate intermediate brightness value in log-converted form, with this latter value being utilized for automatically determining the exposure time or the diaphragm setting of the camera, so that a proper exposure is rapidly determined in a mechanical manner and the desired photographic exposure is easily achieved, in a snapshot, for example.

What is claimed is:

1. In a system for responding to non-uniform scene brightness, a plurality of identical photosensitive means for respectively receiving light from different parts of a scene, for respectively providing, from the received light, inputs which vary according to a geometric progression in accordance with variation in light brightness, and for providing at a pair of said photosensitive means, respectively, maximum and minimum inputs when the scene has light of non-uniform brightness to be received by the plurality of photosensitive means, output means for providing an output from at least one of said pair of photosensitive means, and electrical connecting means electrically connecting said plurality of photosensitive means with said output means for providing at said output means an output determined by said one of said pair of photosensitive means and for converting the geometric progression of said input of each photosensitive means into an arithmetic progression so that the output provided by said output means varies according to an arithmetic progression, said electrical connecting means including a timing circuit means having a resistor and capacitor connected in series with said capacitor of said timing circuit means having a charge which progressively changes during an interval when said plurality of photosensitive means respond to light from different parts of a scene, and said electrical connecting means further including a relay switch means operatively connected with said timing circuit means as well as with said plurality of photosensitive means for automatically opening said timing circuit means and terminating the change in the charge of said capacitor thereof in response to said light input of said one of said pair of photosensitive means, and the charge of said capacitor upon opening of said timing circuit means providing, at least in part, said output at said output means.

2. The combination of claim 1 and wherein said electrical connecting means includes a plurality of diodes electrically connected in series with said plurality of photosensitive means, respectively, for converting the geometric progression to an arithmetic progression.

3. The combination of claim 1 and wherein said electrical connecting means includes a single diode connected between said plurality of photosensitive means and said output means for converting the geometric progression into an arithmetic progression.

4. The combination of claim 1 and wherein said output means includes an indicating means for directly indicating a light value to be used for photographing purposes.

5. The combination of claim 1 and wherein said output means provides outputs from both of said pair of photosensitive means and also is operatively connected with both of said pair of photosensitive means through said electrical connecting means for providing an indication of a light value range between the pair of outputs derived from both of said pair of photosensitive means.

6. The combination of claim 1 and wherein said output means is electrically connected through said electrical connecting means with said plurality of photosensitive means for providing outputs from both of said pair of photosensitive means as well as for providing an intermediate output between the outputs from both of said photosensitive means.

7. The combination of claim 6 and wherein said output means includes means for providing light value outputs to be used for photographic purposes.

8. The combination of claim 6 and including a shutter-closing circuit means for determining exposure time electrically connected with that part of said output means which provides said intermediate output for automatically determining exposure time in accordance with said intermediate output.

9. The combination of claim 6 and including an automatic diaphragm-adjusting circuit means electrically connected with that part of said output means which provides an intermediate output for automatically determining the exposure aperture of a camera in accordance with said intermediate output.

10. The combination of claim 6 and wherein said output means included for determining said intermediate output a differential circuit having a pair of transistors having emitters connected to each other and also having collectors, means connected between said collectors of said transistors for determining said intermediate output, said transistors also having bases, and a pair of variable resistors respectively connected to said bases of said transistors, so that when one of said variable resistors is set in accordance with film speed and the other of said variable resistors is set in accordance with one of the factors of exposure time and diaphragm aperture, said intermediate output will have a value corresponding to the other of said factors.

11. The combination of claim 1 and wherein said electrical connecting means provides at said capacitor of said timing circuit means thereof an increasing charge which is terminated by said relay switch means.

12. The combination of claim 1 and wherein said electrical connecting means provides at said capacitor of said timing circuit means thereof a decreasing charge which is terminated by said relay switch means.

* * * * *